United States Patent Office 2,898,357
Patented Aug. 4, 1959

2,898,357

METHOD FOR MAKING TITANIUM DICHLORIDE DIACETATE

Donald Duane, Metuchen, and James M. O'Shaughnessy, Westfield, N.J., assignors to National Lead Company, New York, N.Y., a corporation of New Jersey No Drawing. Application October 15, 1957
Serial No. 690,189

7 Claims. (Cl. 260—429.5)

This invention relates in general to the production of titanium chloride acetate composition and more particularly to a new and novel process for the production of a titanium chloride acetate powdered material.

Titanium chloride acetate compositions and their method of manufacture have been described in the literature. However, these earlier methods are restricted to liquid-phase reactions wherein liquid acetic acid and liquid titanium tetrachloride are mixed together to produce a crystalline titanium chloride acetate composition. A method typical of those known in the art is more fully described in Zeitschrift für Anorganische Chemie (1925), vol. 143, pp. 383-393.

A characteristic of earlier methods for producing titanium chloride acetate compositions has been a necessity for employing a large number of processing steps in order to obtain a complete separation of the crystalline titanium chloride acetate composition and the hydrogen chloride which is formed as a by-product of the reaction. For example, when reacting the stoichiometric quantities of liquid titanium tetrachloride and liquid acetic acid required to produce titanium dichloride diacetate a glutinous mass comprising titanium dichloride diacetate powder and hydrogen chloride is obtained. In order to drive off the hydrogen chloride, it is necessary to apply heat to this glutinous mass but to provide sufficient heat to this glutinous mass to remove all of the hydrogen chloride without damaging or destroying the titanium chloride acetate is practically impossible on a commercial scale. This difficulty can, however, be somewhat alleviated by using an excess of acetic acid or by using a relatively inactive liquid reaction medium such as carbon tetrachloride or chloroform but at a serious sacrifice in yield of the titanium chloride acetate composition. Moreover, this expedient necessitates several additional processing steps such as fiiltration, washing, and drying in order to obtain the final product. The use of an excess of acetic acid or a relatively inactive liquid reaction medium in combination with additional processing steps obviously increases the over-all cost of the final product.

More recently a direct method for the preparation of titanium chloride acetate composition has been discovered which, as disclosed in U.S. Patent No. 2,670,363, Preparation of Titanium Chloride Acetate Powdered Material, February 23, 1954, comprises preheating titanium tetrachloride and acetic acid to the vapor state, mixing and reacting said vapors in a reaction zone at a temperature of at least 136° C., removing the gaseous hydrogen chloride from the reaction zone and collecting the so-formed titanium chloride acetate powder.

Reaction in the "vapor state" or "vapor phase" shall be understood to denote a process wherein two or more constituents are reacted while each constituent is in the form of a gas or vapor as distinguished from its solid or liquid state. Although the aforesaid vapor phase process has been used on a laboratory scale to produce a titanium chloride acetate product as a fine yellow powder further expansion of this process to a scale suitable for commercial production introduced operational difficulties which seriously impaired the quality of the product. It was found, for example, that when a reactor was used of sufficient capacity to produce from 80-200 lbs. of material per day the product formed was hard, glassy and monolithic in character and collected in a solid form both on the walls of the reactor and in the exhaust ports of the apparatus. These operational difficulties precluded the adoption of the aforesaid vapor phase process on a commercial scale.

An object, therefore, of the present invention is to provide a superior vapor phase process for producing titanium chloride acetate composition separated from the hydrogen chloride by-product.

A further object of the invention is to provide a low temperature vapor phase process for producing titanium chloride acetate in the form of fine yellow powder and on an economical and commercially feasible scale.

A still further object of the invention is to produce a free-flowing titanium dichloride diacetate powdered material by reacting vaporous titanium tetrachloride and vaporous acetic acid in the presence of a non-reactive gaseous diluent.

In its broadest aspects, the instant invention relates to the discovery that by reacting vaporous titanium tetrachloride and vaporous acetic acid in the presence of a non-reactive gaseous diluent, the reaction of the constituents may be carried to completion within the reactor at temperatures lower than have previously been used while the product can be produced on a commercial scale, i.e., at the rate of from 80 to 200 lbs. per day, consistently and in the form of a fine free-flowing yellow powder.

According to the process of the instant invention titanium tetrachloride, acetic acid and a non-reactive diluent such as air or nitrogen are preheated to the vapor state using vaporizing apparatus well-known in the art. These vaporous constituents are then introduced, preferably separately, into the reaction zone of a reactor and heated to form a titanium chloride acetate powdered material and gaseous hydrogen chloride which, in its volatile form, is readily separated and removed from the powdered material.

The titanium tetrachloride, acetic acid and non-reactive diluent may be introduced into the reactor in any proportions according to the process of the instant invention, for it has been found that the titanium chloride acetate powder which is formed will always substantially approximate the composition of titanium dichloride diacetate, $TiCl_2(OCOCH_3)_2$. Any excess of either acetic acid vapor or titanium chloride vapor will be removed with the volatile hydrogen chloride. In actual practice, however, it is preferred to employ approximately stoichiometric proportions of each reactant, that is to say, about 2 moles of glacial acetic acid for each mole of titanium tetrachloride used.

With respect to reaction zone temperatures employed in the instant invention it has been discovered that by admixing a non-reactive gaseous diluent with the vaporous titanium tetrachloride and vaporous acetic acid, the dew point of the gaseous mixture is lowered from a temperature of about 105° C. which is the dew point for mixtures of vaporous titanium tetrachloride and vaporous acetic acid alone, to a temperature which is determined by the proportion of the diluent gas present, and under the preferred conditions of operation is as low as 70° C. As a consequence the constituents will react in the vapor state to form titanium chloride acetate composition at temperatures well below the minimum temperature heretofore thought necessary. In fact by using excessively large quantities of diluent it is possible to produce free-flowing powdered titanium chloride acetate consistently and free of gaseous hydrogen chloride at room temperatures. For example, it has been found that a reaction temperature as low as 23° C. is sufficiently high under appropriate operating conditions to prevent the hydrogen chloride vapor from being absorbed on the powdered material and that as a consequence, the finely divided titanium chloride acetate composition is immediately and completely separated from the volatile hydrogen chloride. This is not, however, a practical operation inasmuch as production rates are low and relatively small quantities of product are produced compared to the relatively large gas volume handled in the reactor. Moreover the hydrogen chloride by-product is diluted by the large excess of diluent gas used. For practical purposes, therefore, it has been found desirable to operate at reaction chamber temperatures higher than 23° C., the minimum operating temperature being about 70° C. While maximum temperatures as high as 170° C. may be used, it has been found that it is desirable to employ temperatures not in excess of 150° C. and in actual practice temperatures no higher than about 100° C. Higher operating temperatures than 170° C. should be avoided since they tend to cause decomposition of the titanium chloride acetate powdered material.

The temperatures referred to above are the temperatures within the reaction zone of the reactor and are developed by the exothermic nature of the reaction between titanium tetrachloride and the acetic acid. No external heating is required to accomplish the reaction and in fact the preferred reaction chamber operating temperature range of from 70 to 100° C. is maintained by cooling the reactor externally by suitable cooling means.

The particular gas used as a diluent of the vaporous titanium tetrachloride, vaporous acetic acid and the gaseous hydrochloric acid by-product must preferably be substantially non-reactive with these constituents under the conditions present in the reactor and substantially free of moisture. Gases which are effective diluents are moisture-free air, nitrogen, argon, carbon dioxide, helium and the like.

By way of illustrating the rates of feed and temperatures used in operating a commercial unit designed to produce from 80 to 200 lbs. of material per 8 hr. day, preheated vaporous titanium tetachloride has been introduced into the reaction zone at temperatures within the range of from 140 to 150° C. and at rates of from 0.17 lb./min. to 0.34 lb./min., while the preheated vaporous acetic acid has been introduced into the reaction zone at temperatures within the range of from 130 to 140° C. at rates which vary from 0.10 lb./min. to 0.21 lb./min. The diluent gas has been metered into the reaction zone at rates of from 1½ to 5 cu. ft./min. While the lower limit of 1½ cu. ft./min. has given some fine powder, it was usually mixed with lumps of some unreacted material and hence the preferred minimum rate of feed of the diluent gas has been about 2 cu. ft./min. at which rate a homogeneous free-flowing product was formed. However, for optimum product and operating conditions, it has been preferred to feed the diluent gas into the reactor at from 4 to 5 cu. ft./min.

It will be understood that the aforesaid rates of feed are not absolute and that they are given for the purpose of illustrating the operating conditions used when employing a given size apparatus, in this instance a reactor measuring approximately 4 inches internal diameter and 4 feet long. If apparatus of either greater or smaller dimensions is used then the rates of feed of the gaseous constituents will necessarily be varied to some degree.

It was found further that by admixing some diluents, and in particular air, the gaseous acetic acid prior to introduction into the reactor, the latter constituent was parially oxidized, thereby forming water which reacted with the product to produce inferior quality. Also, it was found that traces of moisture present in some diluent gases tended to react with the vaporous titanium tetrachloride, causing fouling of the vapor ducts. Hence, it is preferred to introduce the preheated vaporous constituents separately into the reaction zone.

As pointed out above, a vapor phase reaction of vaporous titanium tetrachloride and acetic acid carried out in the absence of a diluent gas will, in general, produce a satisfactory product on a small scale but for reasons which are not clearly understood, this process does not adapt itself to production of free-flowing titanium chloride acetate powdered material on a commercial scale, i.e., at rates of 80 lbs./day or more. However, if a non-reactive moisture-free diluent gas is admixed with the vaporous titanium tetrachloride and acetic acid, the process can be run successfully to produce a high quality product economically and on a commercial scale. The explanation for this is not clearly understood but since it is known that the diluent acts to lower the dew point of the admixed gases it is postulated that the vapor phase reaction is thereby permitted to go substantially to completion even in relatively large reactors such as are required for commercial production. Moreover, it is felt that the lowered dew point obviates condensation of any unreacted materials which might be present, the presence of which would form lumps in the product. And further, it has been found that if a high concentration of gaseous hydrochloric acid is permitted to form within the reaction zone, the effect is to slow down the reaction even to the point where the reaction stops but that, by adding a diluent gas, the latter not only dilutes the gaseous reactants but the hydrochloric acid by-product as well thereby obviating high concentrations of the latter and insuring complete reaction of the reactants.

In order to illustrate more clearly the process of the instant invention, the following examples are given.

*Example I*

A fine free-flowing titanium dichloride diacetate powdered material was prepared on a commercial scale as follows:

Liquid anhydrous titanium tetrachloride was pumped from a reservoir to a vaporizing apparatus where it was vaporized and the titanium tetrachloride vapor was then introduced into a reaction zone, the temperature of the titanium tetrachloride vapor being 142° C. The titanium tetrachloride vapor was introduced into the reaction zone at the rate of 0.15 lb./min. Acetic acid was likewise vaporized and simultaneously but separately metered into the reaction zone at the rate of 0.09 lb./min., the temperature of the vaporous acetic acid being 133° C. Dry air preheated to 25° C. was simultaneously introduced into the reaction zone at the rate of 5 cu. ft./min. by means of a separate feed line. A temperature of 86° C. was maintained in the reaction zone throughout the operation by externally cooling the reactor. The vaporous reactants reacted instantaneously with each other to yield a yellow titanium dichloride diacetate anhydrous powder which collected in a dust collector arranged at the bottom of the reactor. Simultaneously gaseous hydrogen chloride formed as a by-product of the reaction. The HCl vapor was separated from the solid titanium dichloride diacetate powder in the dust collector and vented from the latter thereby leaving the powdered product free of gaseous hydrogen chloride. The reaction was run for a period of 8 hours and gave a total yield of 80 lbs. of titanium dichloride diacetate powder which, when analyzed chemically, was found to comprise 35.0% titanium as $TiO_2$, 52.0% OAc as HOAc, and 30.1% Cl as HCl. The mole ratio of Ti:Cl:OAc was calculated as 1:1.89:1.98 which compares favorably with the theoretical ratio of 1:2:2.

The material prepared by the process of the foregoing example was used to produce $TiO_2$ of the rutile modification by heating the powdered titanium dichloride diacetate to 850° C. in the presence of air.

Example II

The process described in Example I was repeated except that 0.16 lb./min. vaporous titanium tetrachloride at a temperature of 148° C., 0.10 lb./min. of vaporous acetic acid at a temperature of 136° C. were introduced separately into the reaction zone and reacted in the presence of dry air which had been preheated to 25° C. and also separately introduced into the reaction zone, and at the rate of 5 cu. ft./min. The reaction zone was cooled externally to maintain a reaction zone temperature of 75° C. The run was continued for 8 hours and the total yield was 85 lbs. of titanium dichloride diacetate powder which analyzed 34.6% titanium as $TiO_2$, 51.8% OAc as HOAc and 29.9% Cl as HCl. In this run the mole ratio of Ti:Cl:OAc was 1:1.89:1.99.

Example III

In the preceding examples the respective vaporous constituents were introduced into the reaction zone by separate feed lines. The following experiment was conducted by introducing 0.17 lb./min. of vaporous titanium tetrachloride at a temperature of 160° C. into the reaction zone by one feed line and a mixture of 0.11 lb./min. vaporous acetic acid at 134° C. and dry air preheated to 25° C. the mixture being fed to the reactor by means of a second feed line at a rate equal to 4 cu. ft./min. of air. The reaction temperature zone was maintained at 125° C. by external cooling and the product of the reaction was homogeneous but small amounts collected on the walls of the reactor. The product analyzed chemically as comprising: 35.6% titanium as $TiO_2$, 49.1% OAc as HOAc and 30.6% Cl as HCl. In this run the mole ratio of Ti:Cl:OAc was 1:1.88:1.84.

Example IV

A further run was made in which the air, at the rate of 4 cu. ft./min., was divided equally between the vaporous titanium tetrachloride and the vaporous acetic acid. Thus a mixture comprising 0.19 lb./min. vaporous titanium tetrachloride and dry air at the rate of 2 cu. ft./min. was introduced at a temperature of 102° C. into the reaction zone by one feed line; and a mixture comprising 0.13 lb./min. vaporous acetic acid and air at the rate of 2 cu. ft./min. was introduced by a separate line into the reaction zone, the temperature of the latter mixture being 95° C. and the temperature of the reaction zone 110° C. The run was made for only 75 minutes at the end of which a powdered product was obtained having somewhat the quality of the product produced by Example III and which analyzed chemically as comprising 31.6% titanium as $TiO_2$, 53.9% OAc as HOAc, and 28.7% Cl as HCl. The mole ratio of Ti:Cl:OAc was 1:1.71:2.07.

Example V

An additional run was made in which the diluent was nitrogen. Thus 0.17 lb./min. vaporous titanium tetrachloride were fed into the reaction zone by one feed line, 0.11 lb./min. of vaporous acetic acid by a second feed line and nitrogen gas at the rate of 2 cu. ft./min. by a third feed line. The temperature of the reaction zone was 165° C. The run was continued for 8 hours and the yield was 90 lbs. of free-flowing titanium dichloride diacetate powder which analyzed as comprising 33.9% titanium as $TiO_2$, 50.0% OAc as HOAc and 33.2% Cl as HCl. In this instance the ratio of Ti:Cl:OAc was 1:2.15:1.97.

Example VI

An additional run was made to demonstrate that the vapor phase reaction could be conducted at room temperature. Thus one part per minute of dry air at 23° C. was saturated with titanium tetrachloride vapor by passing the dry air through liquid titanium tetrachloride. The $TiCl_4$ saturated air was then introduced into the reactor. Simultaneously but separately two parts per minute of dry air at 23° C. were saturated with acetic acid vapors and were introduced into the reactor. The vapors reacted with each other to form finely divided, solid titanium dichloride diacetate and hydrogen chloride gas. The temperature in the reactor throughout the reaction was 23° C. Chemical analysis indicated that the Ti:Cl:OAc mole ratio of the product was 1:1.93:2.09 which compares favorably with the theoretical ratio of 1:2:2.

Example VII

In order to compare the prior art vapor phase method for producing titanium chloride acetate with the process of the instant invention the following run was made:

0.15 lb./min. vaporous titanium tetrachloride at 151° C. was introduced into the reaction zone of a 4 inch reactor and simultaneously 0.09 part acetic acid at 148° C. was introduced by a separate line into the reaction zone. No diluent gas was used. The reaction was run for one hour and the resulting product consisted of a hard layer of solid material which analyzed chemically as comprising 35.0% titanium as $TiO_2$, 48.5% OAc as HOAc and 37.2% Cl as HCl. The mole ratio of Ti:Cl:OAc was 1:2.33:1.85. This product had none of the free-flowing powdery characteristics of the products produced by reacting vaporous titanium tetrachloride and glacial acetic acid in the presence of air. Moreover, this inferior product solidified within the cooling cone in the reactor and in the exhaust ducts as a consequence of which it was necessary to terminate the operation after relatively short run.

It has been shown by the description of the instant invention and by the examples presented that the titanium chloride acetate composition may be prepared directly by an improved vapor phase reaction between titanium tetrachloride and acetic acid in the presence of a non-reactive moisture-free diluent; and that this process is simple, economical and adapted to the production of a free-flowing titanium dichloride diacetate powdered material suitable for the production of $TiO_2$. It has also been shown that by utilizing the method of this invention, it is unnecessary to employ the techniques of the prior art to separate the hydrogen chloride from the free-flowing powdered titanium chloride acetate; and that the introduction of a non-reactive moisture-free diluent into a reaction zone in which vaporous titanium tetrachloride is reacted with vaporous glacial acetic acid makes it possible to react the latter constituents on a commercial scale.

While this invention has been described and illustrated by the examples shown, it is not intended to be strictly limited thereto and other modifications and variations may be employed by the appended claims.

We claim:

1. In a process for producing titanium dichloride diacetate powdered material wherein vaporous titanium tetrachloride and vaporous acetic acid are reacted in the vapor state, the improvement comprising: reacting said vaporous titanium tetrachloride and acetic acid at a temperature in the range of from 25° C. to 150° C. and in the presence of a vaporous non-reactive diluent to form titanium dichloride diacetate powdered material and by-product gaseous hydrochloric acid said diluent being added in an amount not less than 1.5 cu. ft./min. per 0.1 lb. tetrachloride, collecting the so-formed titanium dichloride diacetate powdered material, and separating said by-product gaseous hydrochloric acid therefrom said powdered material being substantially free of by-product hydrochloric acid.

2. A process for producing titanium dichloride diacetate powdered material according to claim 1 wherein said vaporous, non-reactive diluent is moisture-free air.

3. A process for producing titanium dichloride diacetate powdered material according to claim 1 wherein said vaporous, non-reactive diluent is nitrogen.

4. In a process for producing titanium dichloride diacetate powdered material where vaporous titanium tetrachloride and vaporous acetic acid are reacted in the vapor state, the improvement which comprises: introducing said vaporous titanium tetrachloride and vaporous acetic acid into said reaction zone separately, introducing substantially dry air separately into said reaction zone and reacting said vaporous titanium tetrachloride and vaporous acetic acid in said reaction zone in the presence of said air at a temperature in the range of from 70° C. to 100° C. to form titanium dichloride diacetate powdered material and by-product gaseous hydrochloric acid said air being added in an amount of about 2.0 cu. ft./min. per 0.19 lb. tetrachloride, collecting the so-formed titanium dichloride diacetate powdered material, and separating said by-product gaseous hydrochloric acid therefrom, said powdered material being substantially free of by-product hydrochloric acid.

5. A process for producing titanium dichloride diacetate powdered material comprising the steps of: introducing vaporous titanium tetrachloride, vaporous acetic acid and a vaporous non-reactive, substantially moisture-free diluent separately into a reaction zone, reacting said vaporous titanium tetrachloride and vaporous acetic acid in said reaction zone in the presence of said vaporous non-reactive diluent at a temperature in the range of from 25° C. to 150° C. to form titanium dichloride diacetate powdered material and gaseous by-product hydrochloric acid said diluent being added in an amount not less than 1.5 cu. ft./min. per 0.1 lb. tetrachloride, and separating said gaseous by-product hydrochloric acid from said titanium dichloride diacetate powdered material to produce a powdered material free of by-product hydrochloric acid.

6. A process for producing titanium dichloride diacetate powdered material according to claim 4 where said vaporous non-reactive diluent is air.

7. A process for producing titanium dichloride diacetate powdered material according to claim 4 where said vaporous non-reactive diluent is nitrogen.

References Cited in the file of this patent

UNITED STATES PATENTS 2,670,363    Wadington    Feb. 23, 1954